(12) United States Patent
Covington et al.

(10) Patent No.: US 10,106,255 B2
(45) Date of Patent: Oct. 23, 2018

(54) ROTARY PYLON CONVERSION ACTUATOR FOR TILTROTOR AIRCRAFT

(71) Applicant: Bell Helicopter Textron Inc., Fort Worth, TX (US)

(72) Inventors: Charles Eric Covington, Colleyville, TX (US); Eric S. Olson, Fort Worth, TX (US); David R. Bockmiller, Fort Worth, TX (US); Carlos A. Fenny, Fort Worth, TX (US)

(*) Notice: Subject to any disclaimer, the term of this patent is extended or adjusted under 35 U.S.C. 154(b) by 726 days.

(21) Appl. No.: 14/712,218

(22) Filed: May 14, 2015

(65) Prior Publication Data

US 2015/0360774 A1 Dec. 17, 2015

Related U.S. Application Data

(60) Provisional application No. 61/992,971, filed on May 14, 2014.

(51) Int. Cl.

| | |
|---|---|
| *B64C 29/00* | (2006.01) |
| *B64C 27/08* | (2006.01) |
| *B64C 27/52* | (2006.01) |
| *B64C 27/28* | (2006.01) |
| *F16H 1/22* | (2006.01) |
| *B64D 35/04* | (2006.01) |
| *B64D 35/08* | (2006.01) |

(52) U.S. Cl.
CPC .......... *B64C 29/0033* (2013.01); *B64C 27/08* (2013.01); *B64C 27/28* (2013.01); *B64C 27/52* (2013.01); *B64D 35/04* (2013.01); *B64D 35/08* (2013.01); *F16H 1/22* (2013.01)

(58) Field of Classification Search
CPC ..... B64C 29/0033; B64C 27/08; B64C 27/52; B64D 35/00; B64D 35/04; B64D 35/08; F16H 1/227; F16H 3/724
See application file for complete search history.

(56) References Cited

U.S. PATENT DOCUMENTS

| | | | | |
|---|---|---|---|---|
| 2,364,096 A | * | 12/1944 | Platt | B64C 27/82 244/17.19 |
| 2,402,043 A | * | 6/1946 | Hays | B64C 27/12 416/170 R |
| 2,700,311 A | * | 1/1955 | Bade | B64D 35/04 475/330 |
| 4,519,272 A | * | 5/1985 | Meier | B61C 11/04 105/73 |
| 6,247,667 B1 | | 6/2001 | Fenny | |

(Continued)

*Primary Examiner* — Jacob S. Scott
*Assistant Examiner* — Tinh Dang
(74) *Attorney, Agent, or Firm* — Lightfoot & Alford PLLC

(57) ABSTRACT

A tiltrotor aircraft can include a pylon rotatable about a conversion axis. A first differential planetary assembly can include a first housing; a first ring gear; a first differential planetary gear having a first output portion; and a first differential sun gear. A second differential planetary assembly can include a second housing; a second ring gear; a second differential planetary gear having a second output portion; and a second differential sun gear. The first output portion is coupled to the second housing such that the second housing rotates at a first output speed. Further, the second output portion is coupled to the shaft, the shaft being coupled to the pylon such that rotation of the shaft rotates the pylon.

16 Claims, 19 Drawing Sheets

(56) References Cited

U.S. PATENT DOCUMENTS

| | | | |
|---|---|---|---|
| 6,260,793 B1* | 7/2001 | Balayn | B64C 7/00 244/130 |
| 6,276,633 B1* | 8/2001 | Balayn | B64C 27/12 244/56 |
| 6,382,556 B1* | 5/2002 | Pham | B64C 27/28 244/6 |
| 7,871,033 B2 | 1/2011 | Karem | |
| 7,913,947 B2 | 3/2011 | Haynes | |
| 8,231,503 B2* | 7/2012 | Buelna | B64C 29/0033 475/344 |
| 9,174,741 B2* | 11/2015 | Suntharalingam | B64D 27/02 |
| 9,290,266 B2* | 3/2016 | Robertson | F16H 3/724 |
| 9,701,406 B2* | 7/2017 | Robertson | B64C 29/0033 |
| 2015/0354672 A1* | 12/2015 | Bauwer | F16H 3/663 |
| 2016/0076630 A1* | 3/2016 | Hehenberger | F03D 7/0276 475/5 |

* cited by examiner

ROTARY PYLON CONVERSION ACTUATOR FOR TILTROTOR AIRCRAFT

BACKGROUND

Technical Field

The embodiments of the present disclosure relate to a pylon conversion actuator for a tiltrotor aircraft.

Description of Related Art

In a conventional arrangement, a ball-screw type actuator is used to actuate a proprotor pylon between an airplane mode and a helicopter mode. The ball-screw actuator acts as an extensible link between the airframe and the proprotor pylon. One shortcoming of the ball-screw actuator is that the components are exposed, leaving the system susceptible to jamming from foreign object debris. Further, the system can have limited motion when subjected to a jam between the ball-screw and the nut that drives it.

There is a need for an improved tiltrotor pylon conversion actuator for establishing the angle between the tiltrotor pylon and the airframe.

DESCRIPTION OF THE DRAWINGS

The novel features believed characteristic of the embodiments of the apparatus and method of the present disclosure are set forth in the appended claims. However, the apparatus and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of the apparatus and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
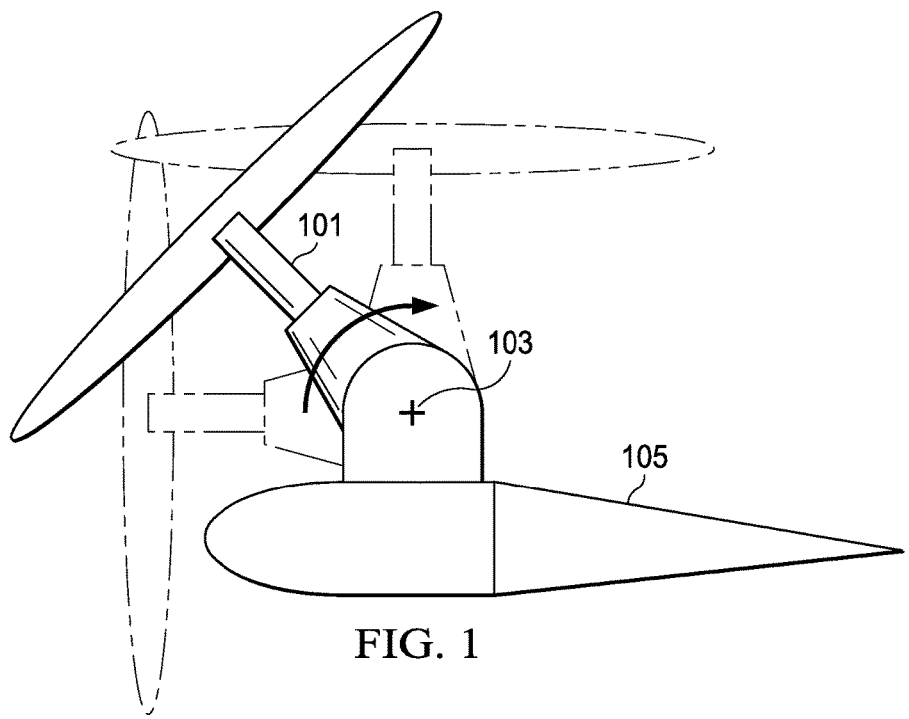
FIG. 1 is a schematic view of a tiltrotor pylon, according to one example embodiment.
Figure 2:
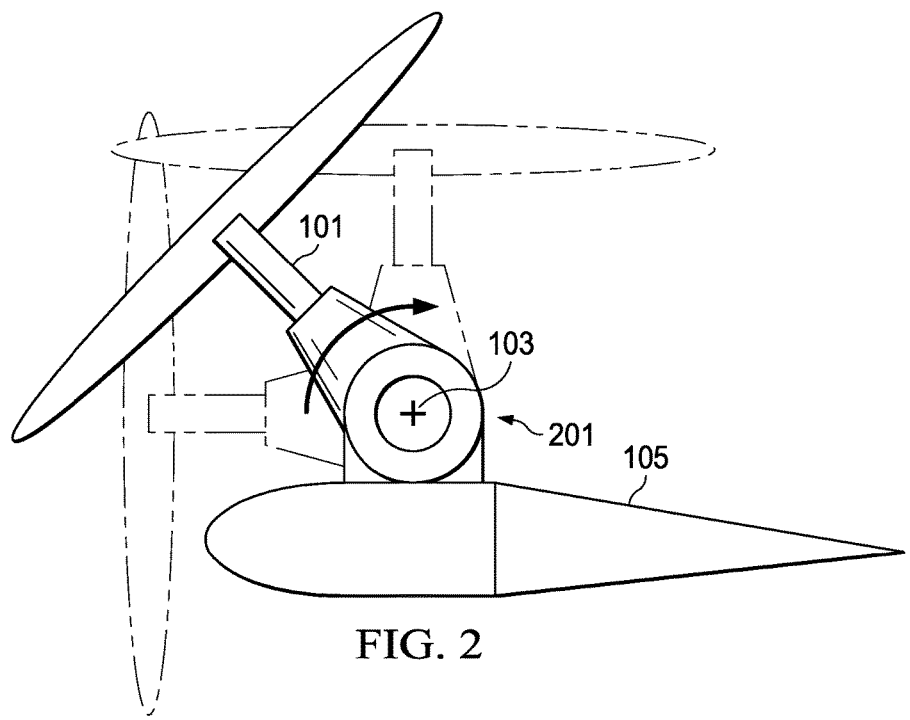
FIG. 2 is a schematic view of an actuator system and pylon, according to one example embodiment.

Referring now to FIG. 1, a top level view of tiltrotor rotor system is schematically illustrated. A tiltrotor aircraft can have a proprotor pylon 101 that is configured to be rotated about a conversion axis 103 between approximately 0° in airplane mode to approximately 90° in helicopter mode, and to approximately 95° in certain maneuvers. A pylon conversional actuator can selectively position the pylon throughout the 0°-95° range and react loads between the pylon 101 and the airframe 105.

Figure 19:
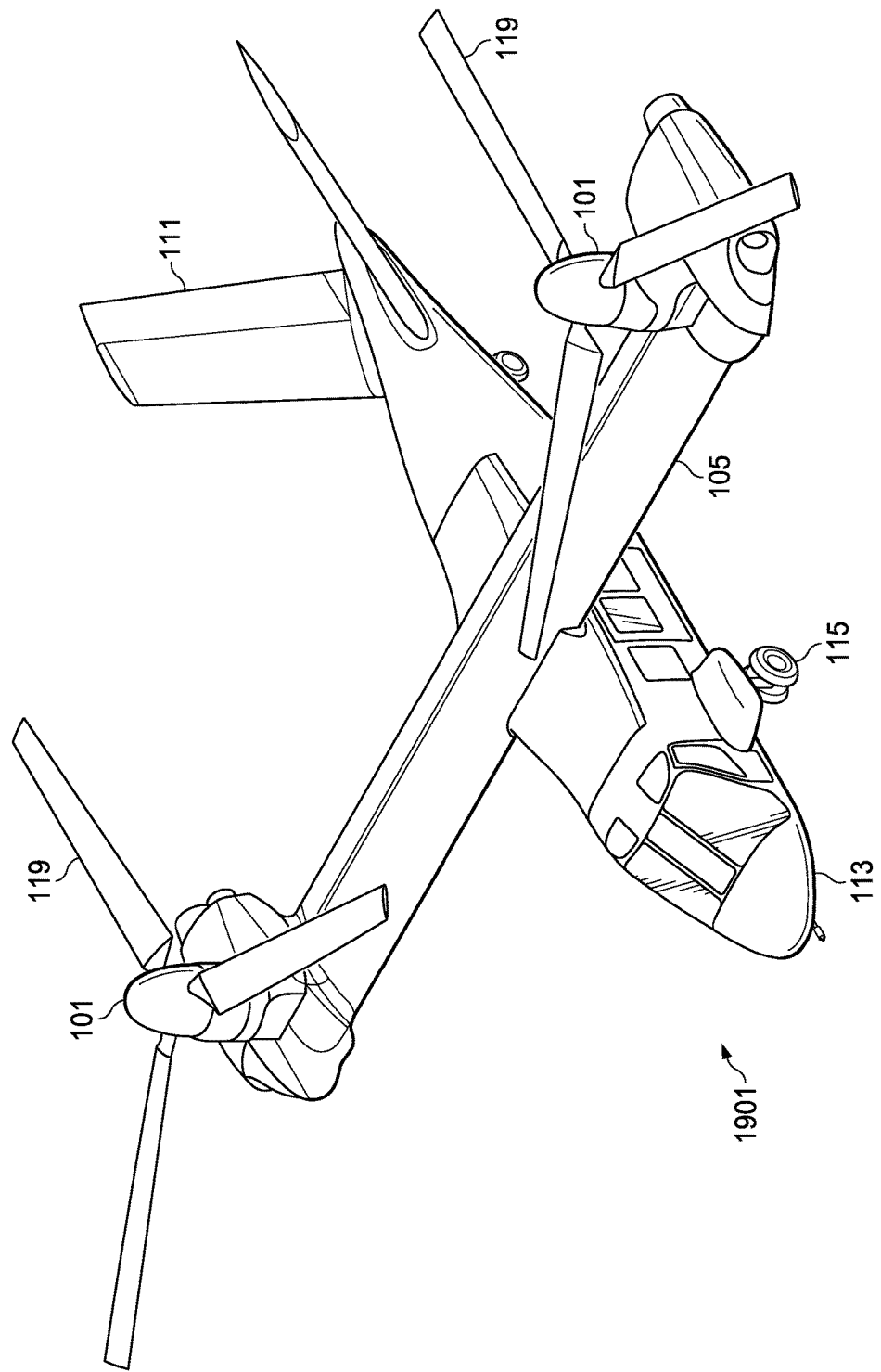
FIG. 19 is a perspective view of a tiltrotor aircraft in a helicopter mode, according to one example embodiment.
Figure 20:
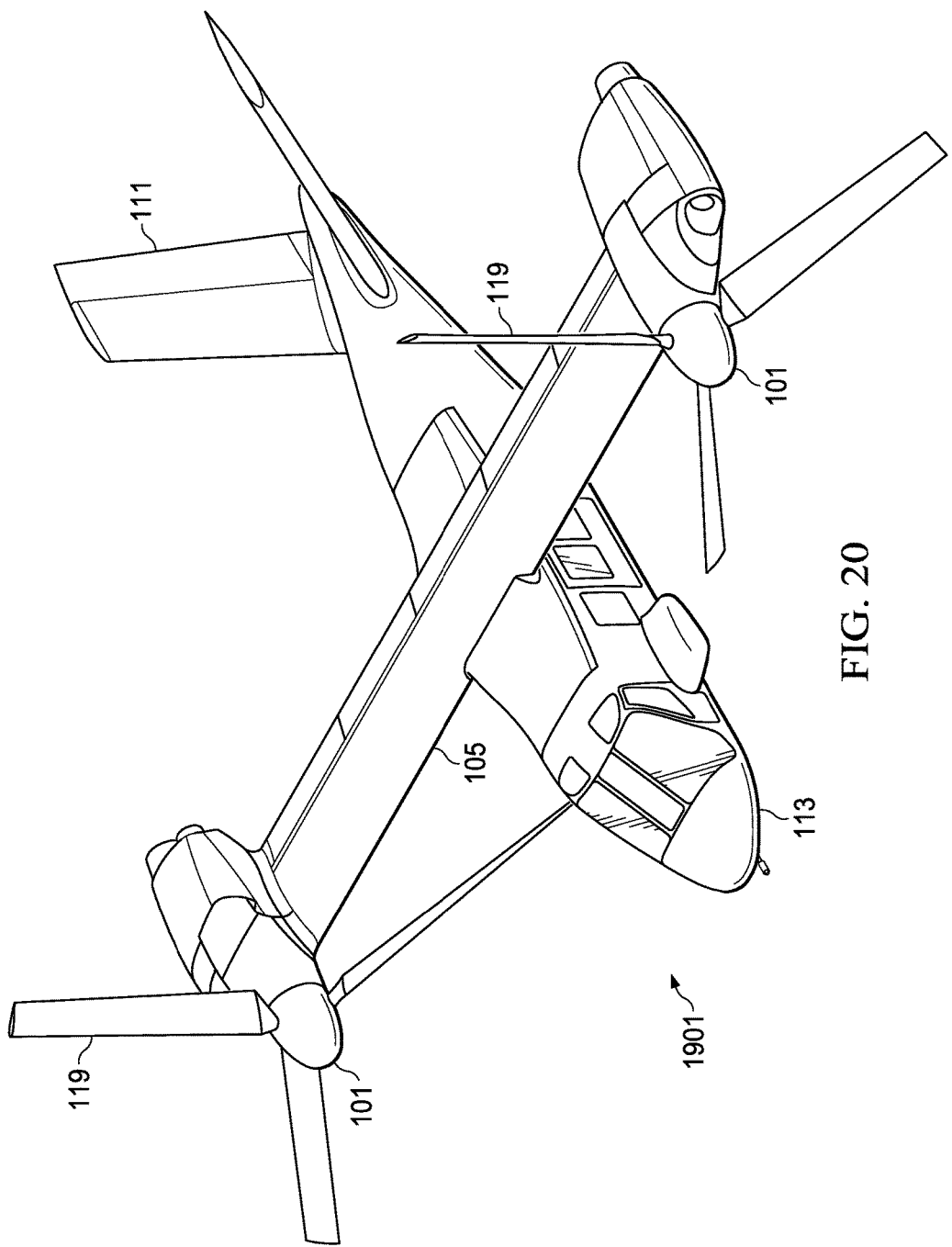
FIG. 20 is a perspective view of a tiltrotor aircraft in an airplane mode, according to one example embodiment.

Referring briefly to FIGS. 19 and 20 in the drawings, a tiltrotor aircraft 1901 is illustrated. Tiltrotor aircraft 1901 can include a fuselage 113, a landing gear 115, a tail member 111, and a wing 105. Each propulsion system includes a fixed engine and a rotatable proprotor 101. Each rotatable proprotor 101 has a plurality of rotor blades 119 associated therewith. The position of proprotors 101, as well as the pitch of rotor blades 119, can be selectively controlled in order to selectively control direction, thrust, and lift of tiltrotor aircraft 1901.

FIG. 19 illustrates tiltrotor aircraft 1901 in helicopter mode, in which proprotors 101 are positioned substantially vertical to provide a lifting thrust. FIG. 20 illustrates tiltrotor aircraft 1901 in an airplane mode, in which proprotors 101 are positioned substantially horizontal to provide a forward thrust in which a lifting force is supplied by wing 105. It should be appreciated that tiltrotor aircraft can be operated such that proprotors 101 are selectively positioned between airplane mode and helicopter mode, which can be referred to as a conversion mode.

Referring now to FIGS. 2-13, an actuator system 201 according to an embodiment of the present disclosure is illustrated. Actuator system 201 is an assembly of rotary differential planetary drive components that collectively function to position the pylon 101 and react moments that arise both on the ground and during flight. Redundant differential planetary elements provide continued operation in the event of a mechanical jam or other loss of function within any element.

Figure 3:
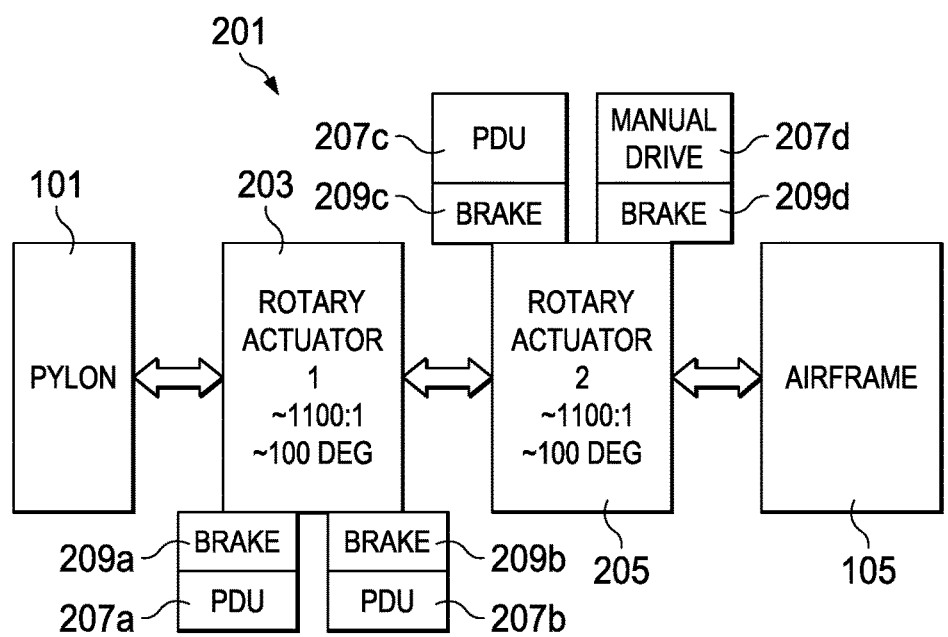
FIG. 3 is a functional schematic view of an actuator system, according to one example embodiment.

Referring to FIG. 3, actuator system 201 is schematically illustrated with functional elements. Actuator system 201 can include an outer differential planetary system 203 and an inner differential planetary system 205 mechanically coupled to each other between a fixed portion of the airframe 105 and the pylon 101. Each of the outer differential planetary system 203 and the inner differential planetary system 205 can include a differential gear set, an input reduction gear stage, and one or more power drive units (PDUs) 207a-207c, and one or more brakes 209a-209d. Power drive units 207a-207c can be electrically powered (EPDU) or hydraulically powered (HPDU), for example. A manual drive 207d may be utilized as a manual system for rotating proprotor 101 during maintenance, for example. Brakes 209a-209d can provide drive and holding torque for the outer differential planetary system 203 and the inner differential planetary system 205 when the pylon 101 is not being rotated about the conversion axis 103. Either of the outer differential planetary system 203 and the inner differential planetary system 205 can rotate pylon 101 through a full range of motion. In one embodiment, the outer differential planetary system 203 and the inner differential planetary system 205 are located in a nested configuration. In another embodiment, the outer differential planetary system 203 and the inner differential planetary system 205 are located adjacent to one another.

Figure 4:
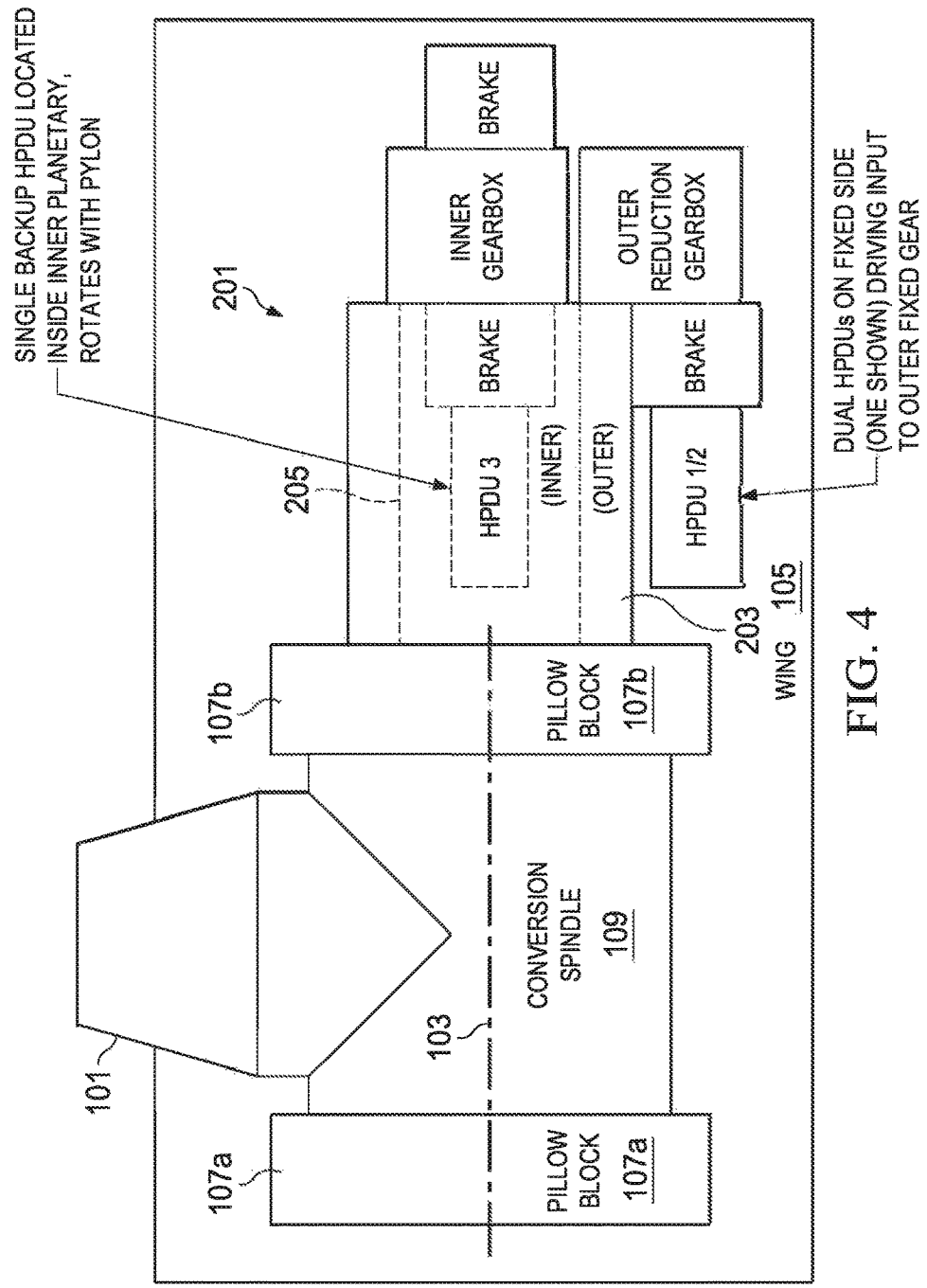
FIG. 4 is a schematic view looking down of an actuator system, according to one example embodiment.

Referring to FIG. 4, a nested configuration of actuator system 201 is schematically illustrated. Proprotor pylon 101 can be mounted to a conversion spindle 109. In the example embodiment, conversion spindle 109 is rotatably mounted to airframe 105 on pillow blocks 107a and 107b. For example, conversion spindle 109 can be mounted on bearings that define a rotational axis of conversion spindle 109 that aligns with conversion axis 103. Conversion spindle 109 is coupled to inner differential planetary system 205 via a splined shaft 503 capable of transmitting torque therebetween. Outer differential planetary system 203 is grounded to the airframe 105, which in the example embodiment is the airframe of a wing of a tiltrotor aircraft.

Figure 5:
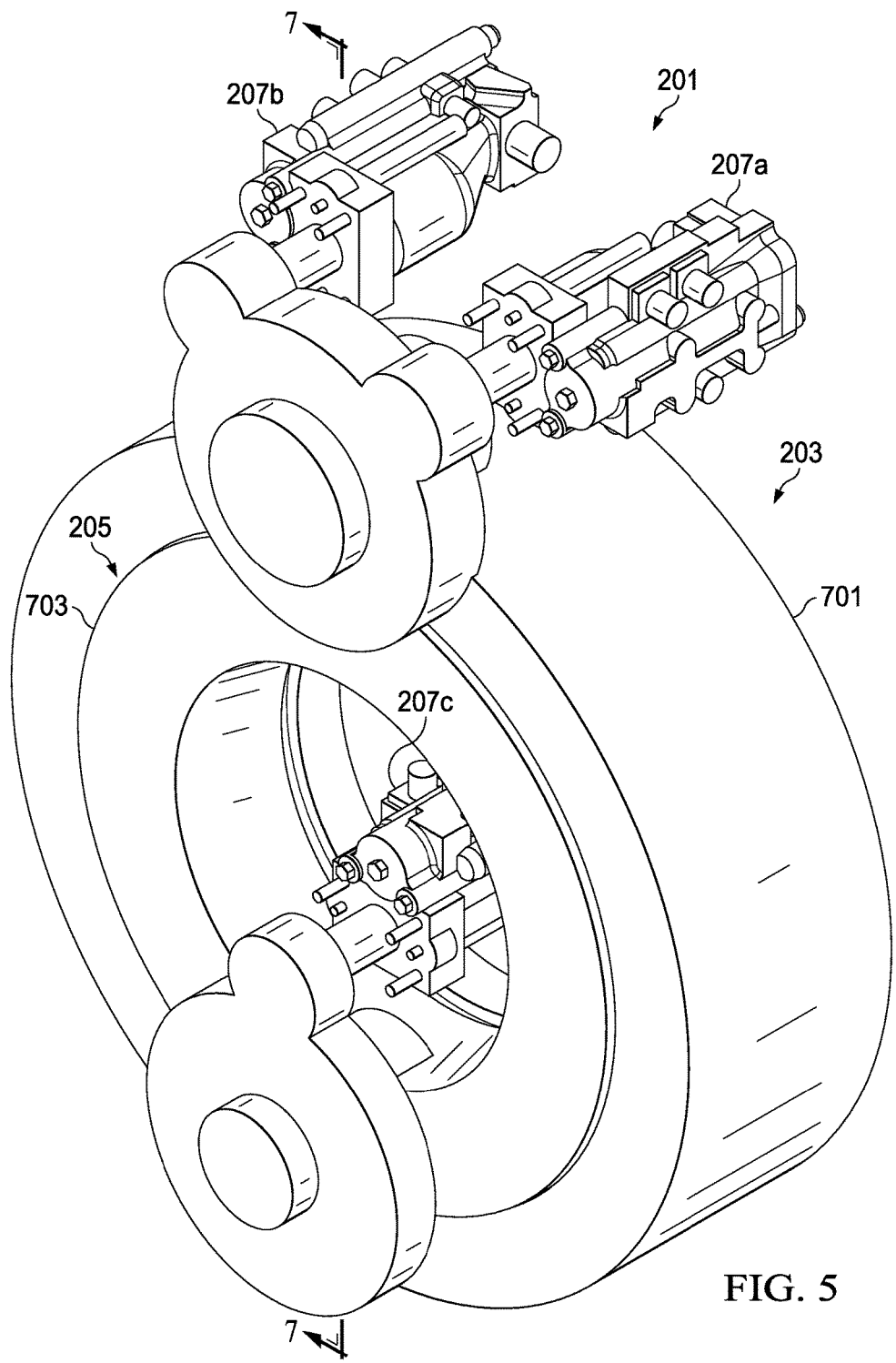
FIG. 5 is a isometric view of an actuator system, according to one example embodiment.
Figure 6:
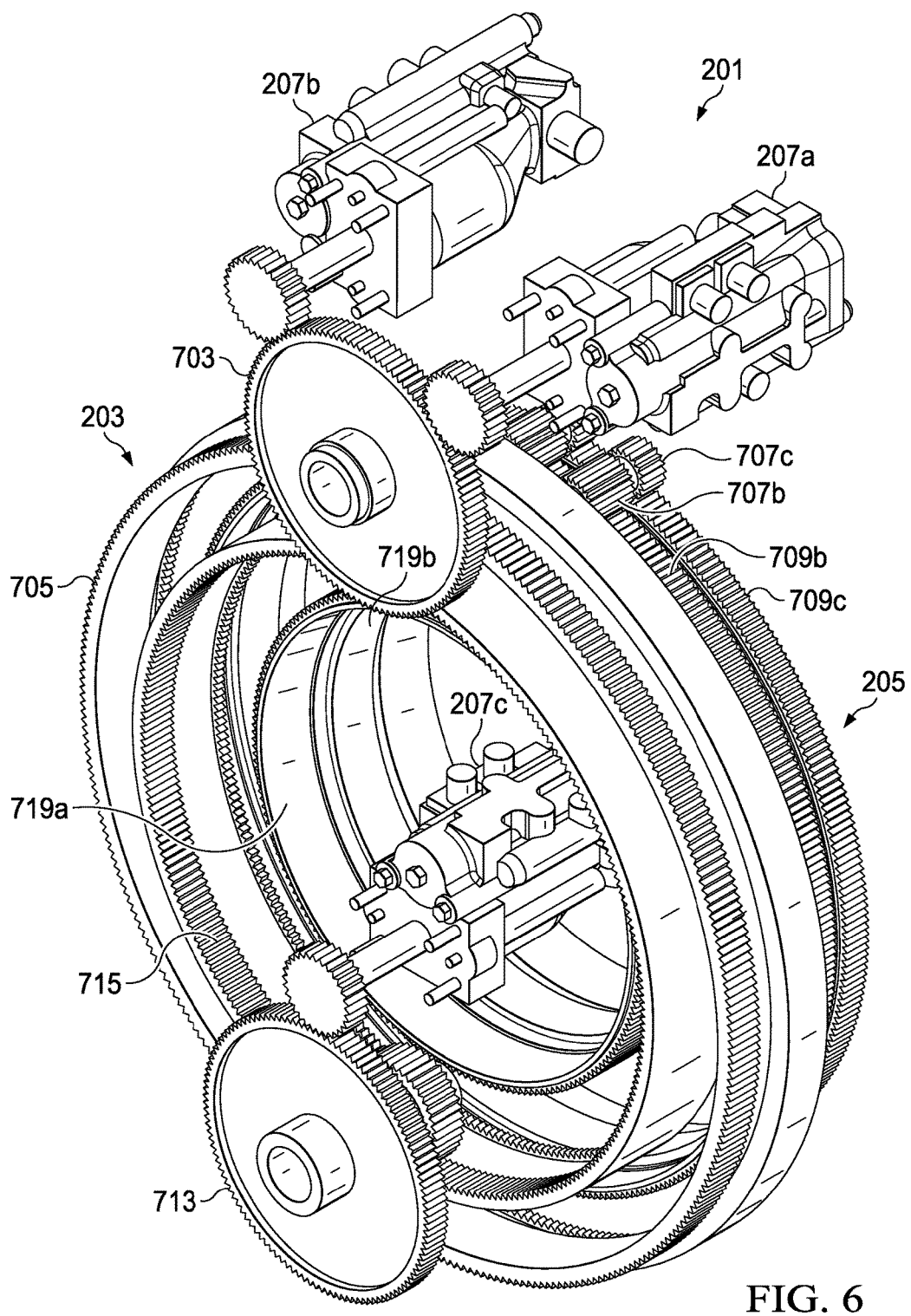
FIG. 6 is a view looking outboard of an actuator system, according to one example embodiment.
Figure 7:
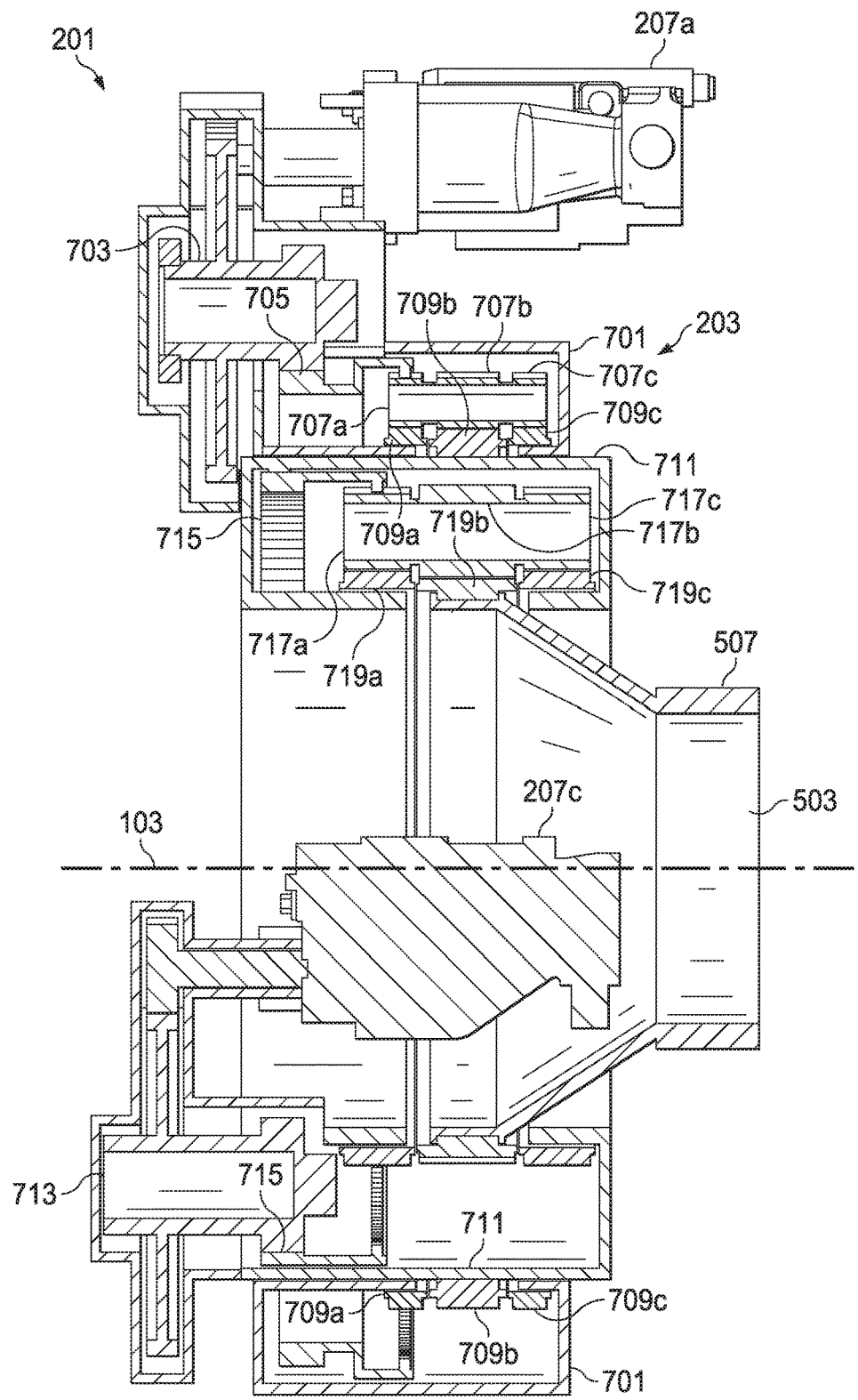
FIG. 7 is a cross-sectional view of actuator system, taken from section lines 7-7 in FIG. 5, according to one example embodiment.
Figure 8:
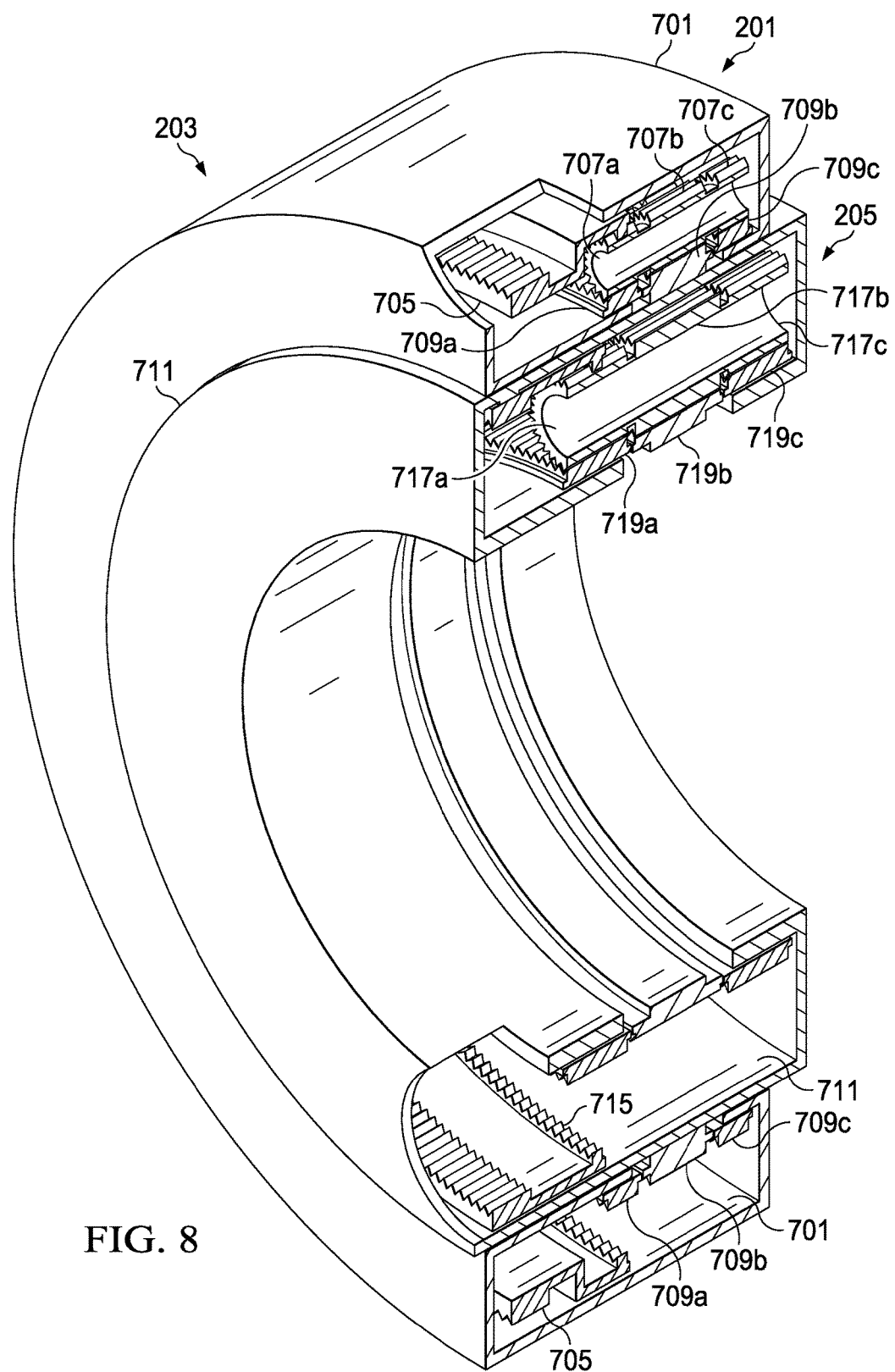
FIG. 8 is a partially sectioned isometric view of an actuator system, according to one example embodiment.
Figure 9:
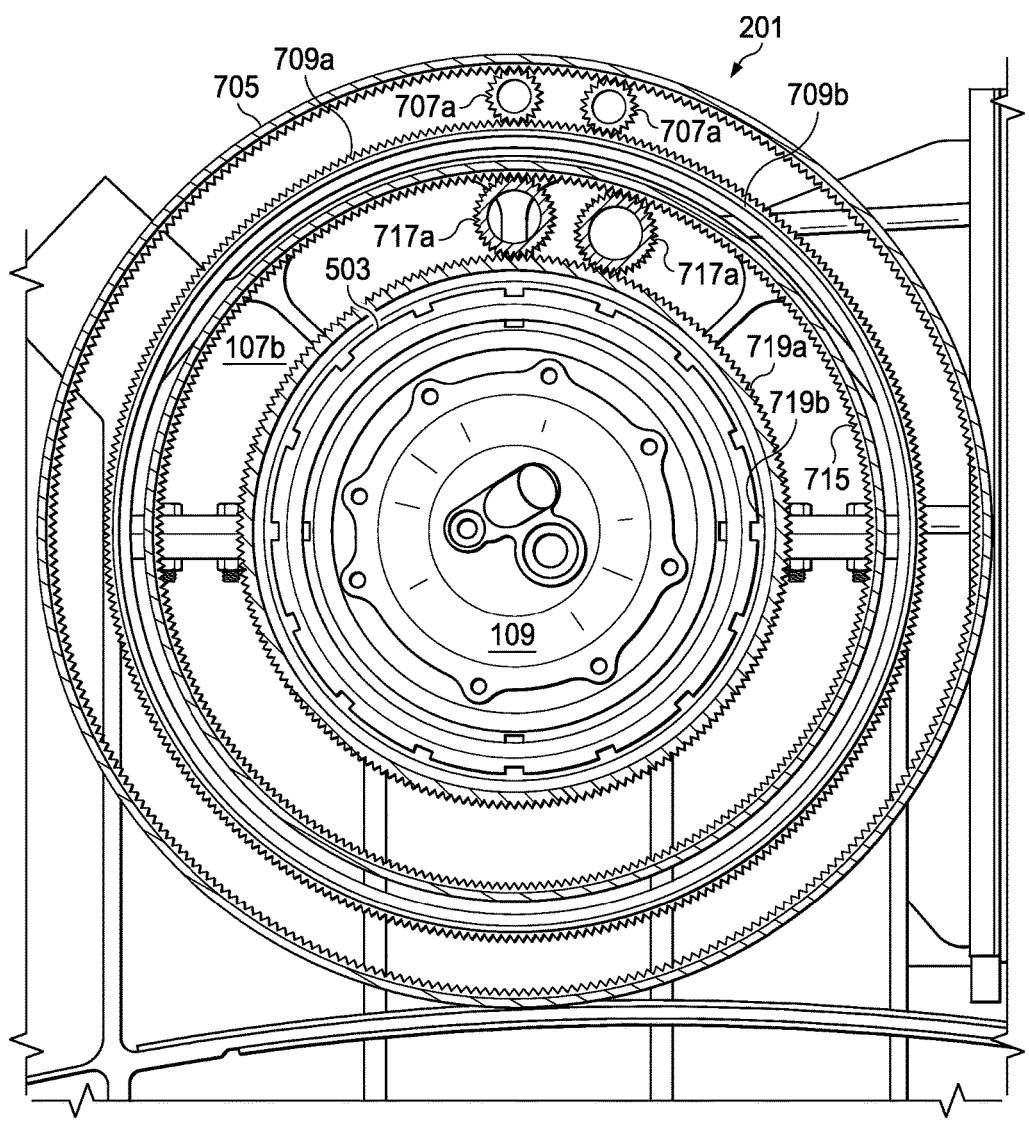
FIG. 9 is a partially sectioned side view of an actuator system, according to one example embodiment.
Figure 10:
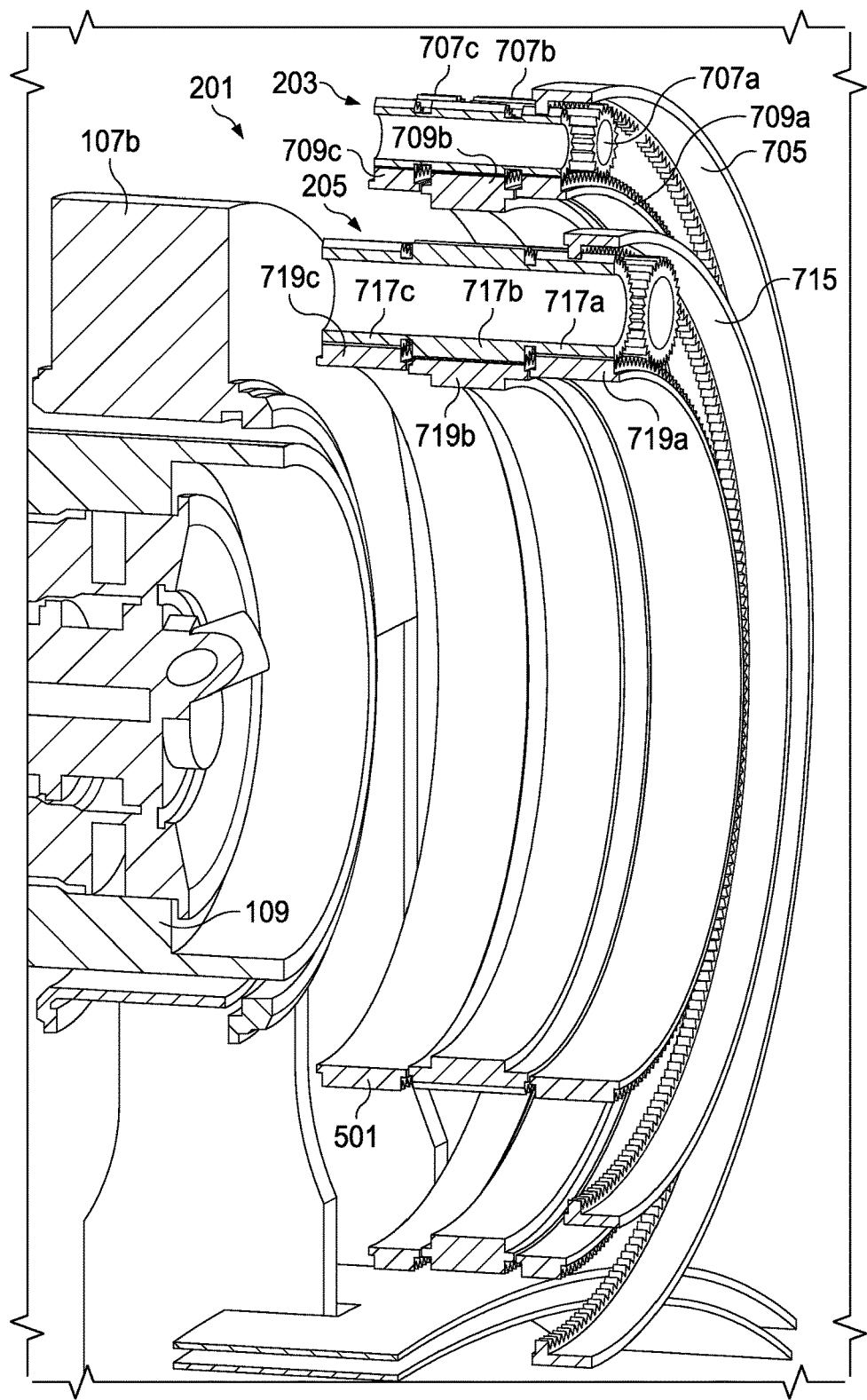
FIG. 10 is a partially sectioned isometric view of an actuator system, according to one example embodiment.

Referring now to FIGS. 5-7, an example embodiment of actuator system 201 is illustrated in further detail. Some details are removed from selected figures in the interest of clarity. Outer differential planetary system 203 can include a housing 701, an input gear set 703, a ring gear 705, a differential planetary gear 707, and a differential sun gear 709. The housing 701 is configured to protect internal components from contamination and contain lubrication. Housing 701 is grounded to the airframe 103, thus housing 701 is fixed and does not rotate. Power drive units 207a and 207b are fixed to the housing 701. Power drive units 207a and 207b can selectively rotate input gear set 703 which in turn rotates ring gear 705. Ring gear 705 also includes a second set of gear teeth which are in contact with a first portion 707a of differential planetary gear 707 so as to drive differential planetary gear 707. Differential planetary gear 707 also includes a center geared portion 707b and a second portion 707c. The center geared portion 707b has a different number of gear teeth in relation to the first portion 707a and the second portion 707c. In the example embodiment, the center geared portion 707b has one more tooth compared to the first portion 707a and the second portion 707c. The first portion 707a, center geared portion 707b, and the second portion 707c are in gear mesh with a first portion 709a, a center portion 709b, and a second portion 709c of differential sun gear 709, respectively. As a result, the center portion 709b rotates at a different speed than first portion 709a and second portion 709c. The center portion 709b of differential sun gear 709 is the output of the outer differential planetary system 203, which in the illustrated embodiment is coupled to a housing 711 of the inner differential planetary system 205.

Inner differential planetary system 205 can include a housing 711, an input gear set 713, a ring gear 715, a differential planetary gear 717, and a differential sun gear 719. The housing 711 is configured to protect internal components from contamination and contain lubrication. Since housing 711 is the output of outer differential planetary system 203, housing 711 rotates at the output speed of outer differential planetary system 203. Power drive unit 207c is coupled to housing 711, thus power drive unit 707c rotates along with housing 711. Power drive unit 207c selectively rotate input gear set 713 which in turn rotates ring gear 715. Ring gear 715 also includes a second set of gear teeth which are in contact with a first portion 717a of differential planetary gear 717 so as to drive differential planetary gear 717. Differential planetary gear 717 also includes a center geared portion 717b and a second portion 717c. The center geared portion 717b has a different number of gear teeth in relation to the first portion 717a and the second portion 717c. In the example embodiment, the center geared portion 717b has one more tooth compared to the first portion 717a and the second portion 717c. The first portion 717a, center geared portion 717b, and the second portion 717c are in gear mesh with a first portion 719a, a center portion 719b, and a second portion 719c of differential sun gear 719, respectively. As a result, the center portion 719b rotates at a different speed than first portion 719a and second portion 719c. The center portion 719b of differential sun gear 719 is the output of the outer differential planetary system 205, which in the illustrated embodiment is coupled to an input portion 507 of splined shaft 503. Splined shaft 503 has an output portion 507 that is splined engagement with conversion spindle 109.

During operation, power drive units 207a-207c are selectively commanded in order to rotate pylon 101 between an airplane mode, in which pylon 101 is substantially horizontal, and a helicopter mode in which pylon 101 is substantially vertical. In a manned tiltrotor, the pilot can selectively command power drive units 207a-207c in each direction. During normal operation, both the outer differential planetary system 203 and the inner differential planetary system 205 operate to rotate the pylon 101 at a normal operating speed. Should one of the outer differential planetary system 203 and the inner differential planetary system 205 fail and become fixed, the remaining healthy differential planetary system can still function to rotate pylon 101 in the complete range of motion, but at a reduced speed. In an embodiment in which the outer differential planetary system 203 and the inner differential planetary system 205 are configured to operate at the same speed, then the reduced speed is half of the normal operational speed.

Figure 11:
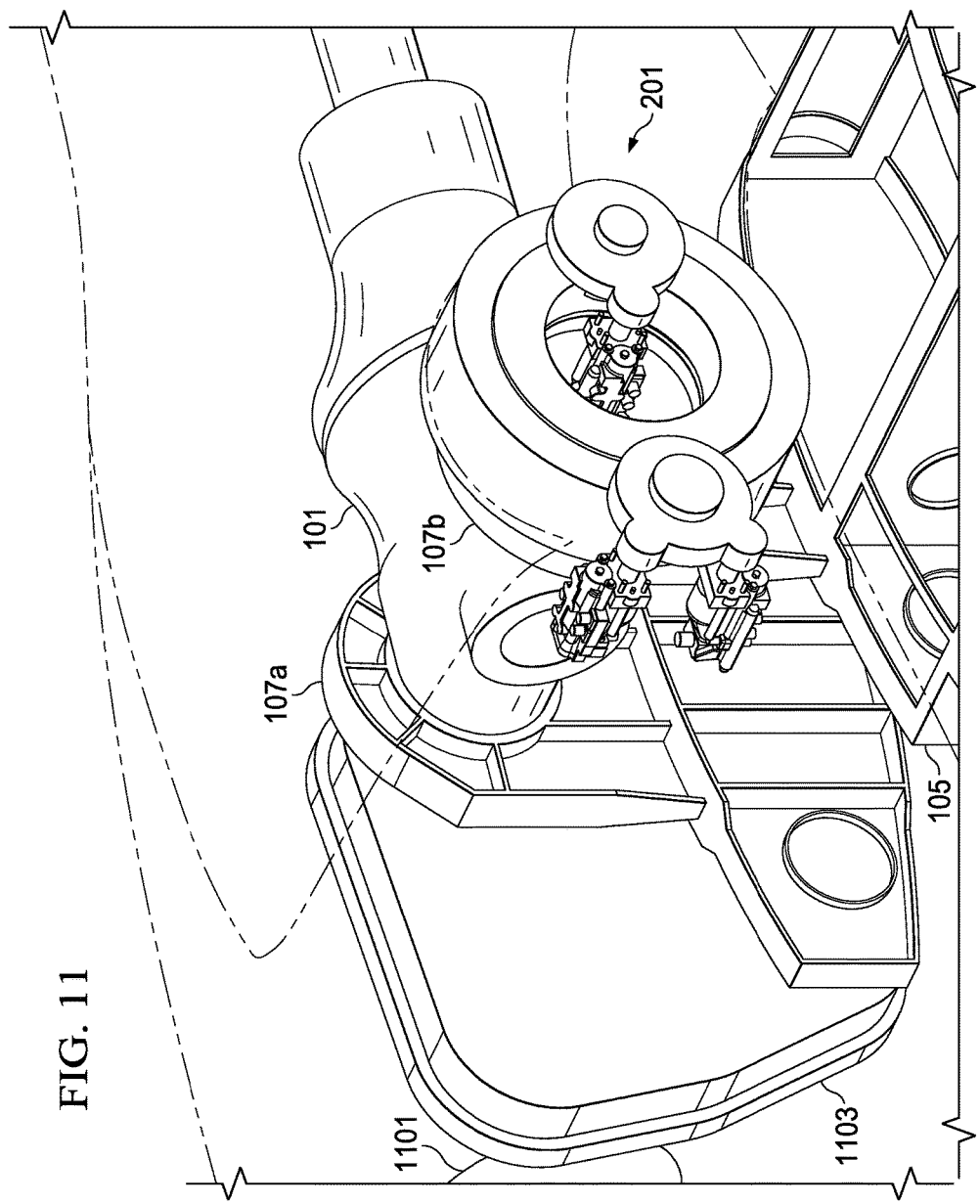
FIG. 11 is an isometric view of an actuator system, according to one example embodiment.
Figure 12:
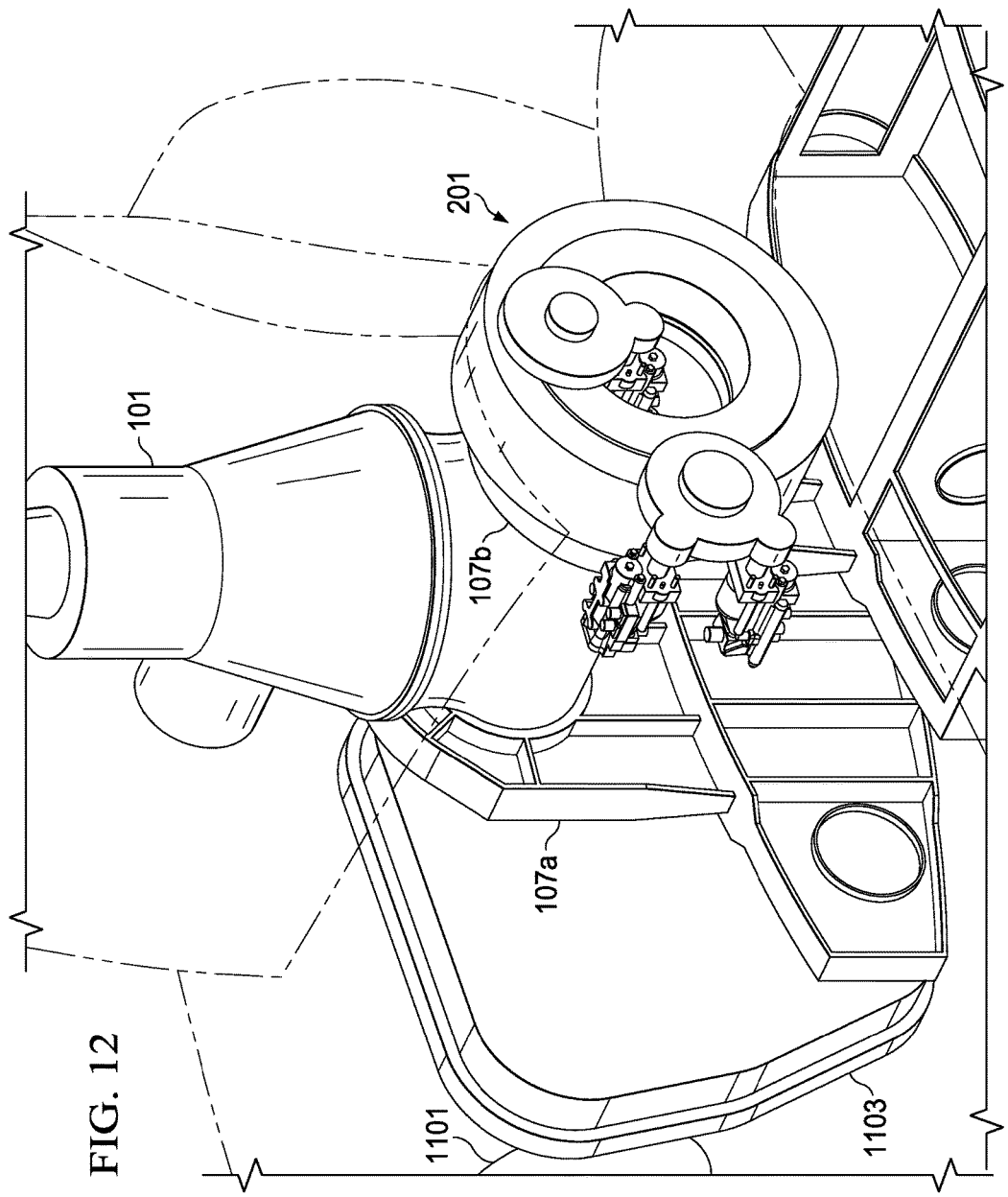
FIG. 12 is an isometric view of an actuator system, according to one example embodiment.
Figure 13:
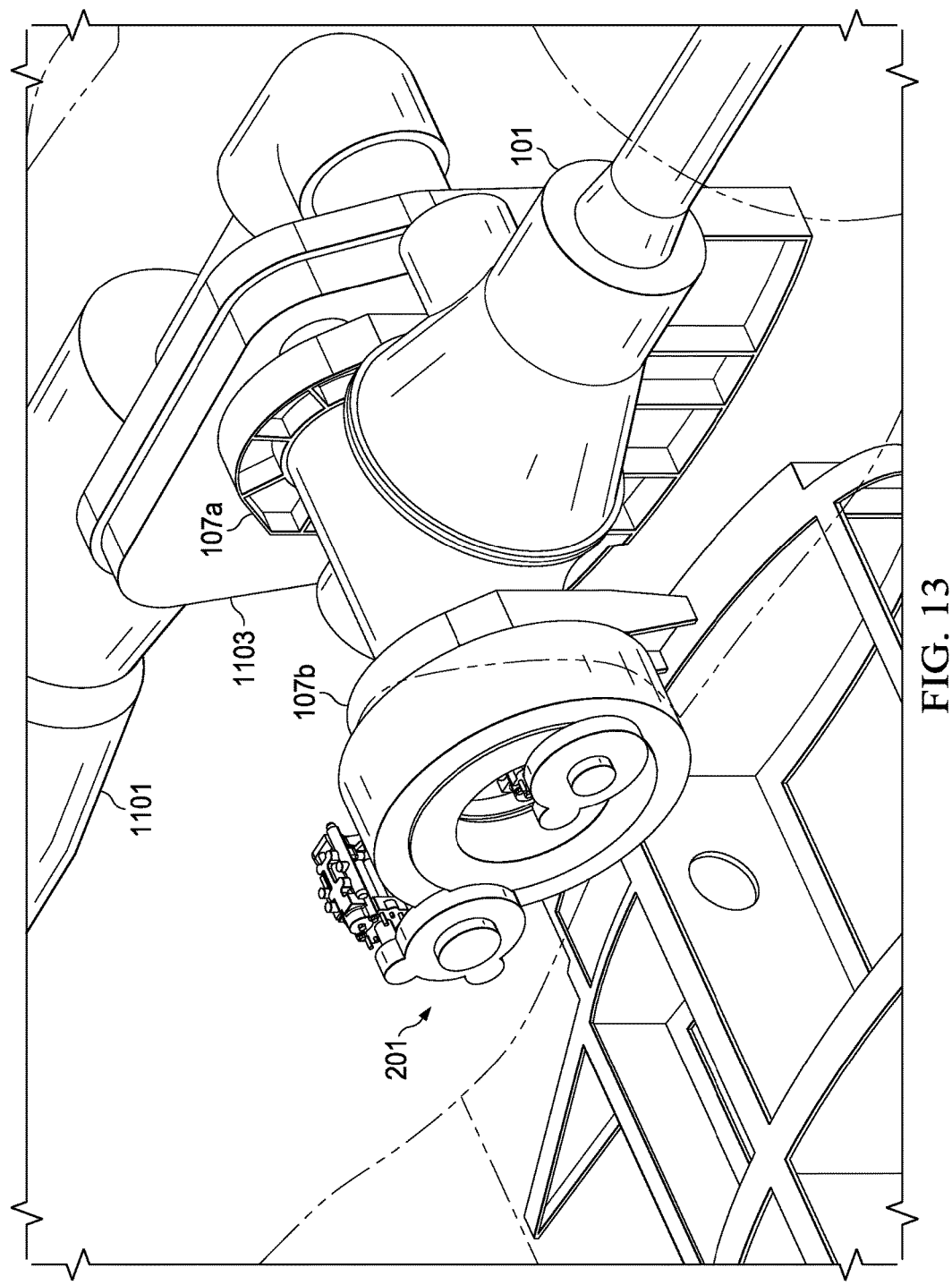
FIG. 13 is an isometric view of an actuator system, according to one example embodiment.
Figure 14:
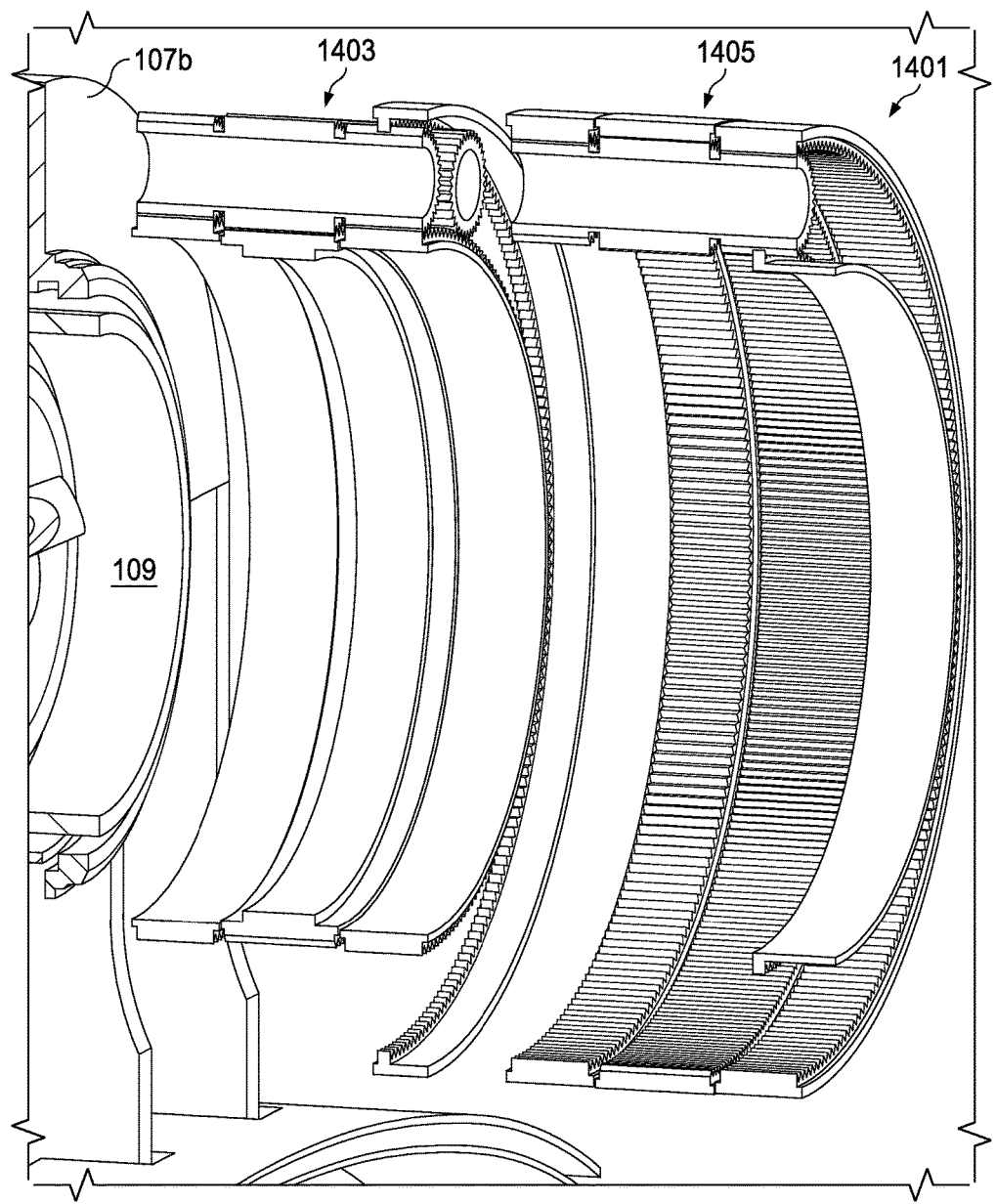
FIG. 14 is an isometric view of an actuator system, according to another example embodiment.
Figure 15:
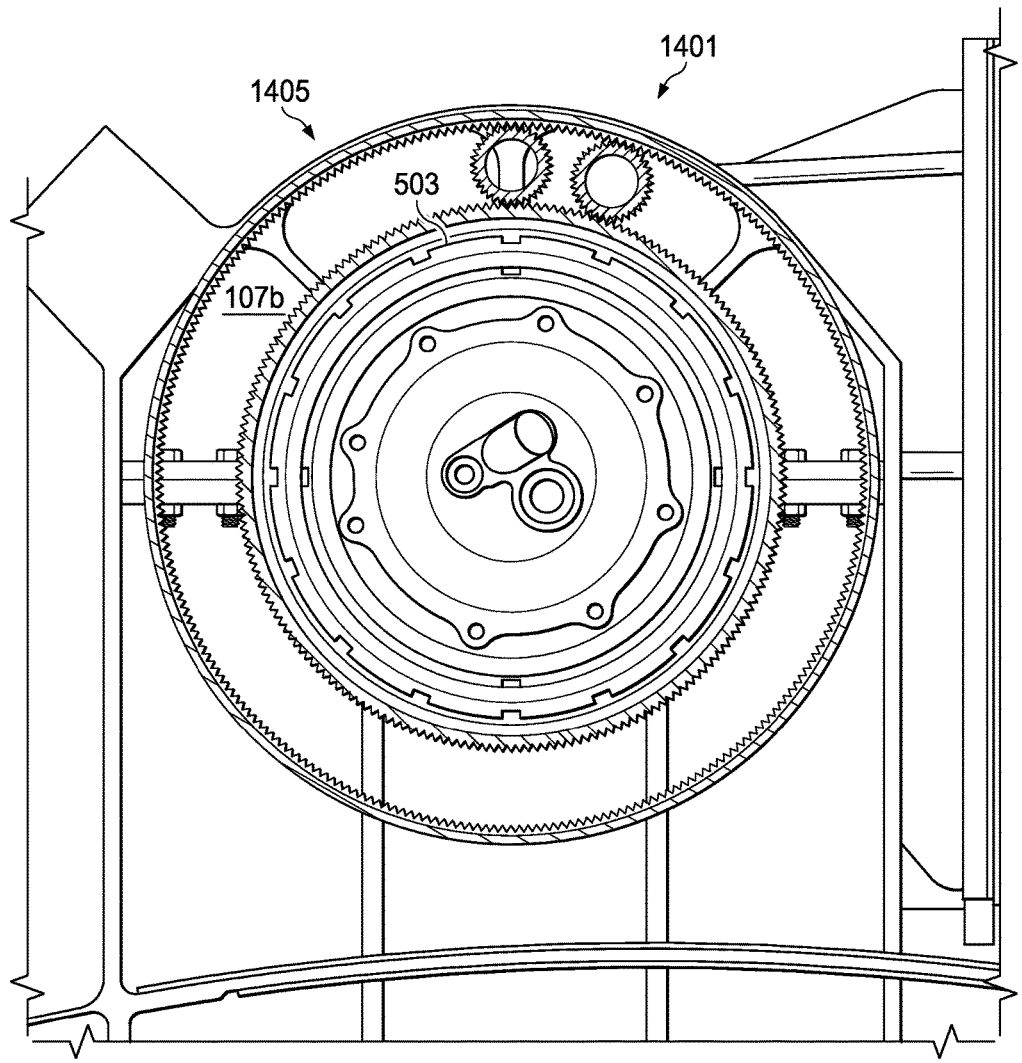
FIG. 15 is view looking inboard of an actuator system, according to the embodiment from FIG. 14.

Referring now also to FIGS. 11-13, actuator system 101 is illustrated as installed in a tiltrotor aircraft. In the illustrated embodiment, actuator system 101 is located on the opposite side of the engine power input. For example, engine power can be transmitted from an engine 1101, through a gearbox 1103, and through an opening in pillow block 107a. Such a configuration can provide packaging benefits.

Referring now to FIGS. 14-18, another embodiment of actuator system 201 is illustrated. Actuator system 1401 differs from actuator system 201 in that the two differential planetary systems are located adjacent to each other rather than being nested. Further, the differential planetary system 1403 is substantially similar to inner differential planetary system 205 and the differential planetary system 1405 is similar to outer differential planetary system 203.

Figure 16:
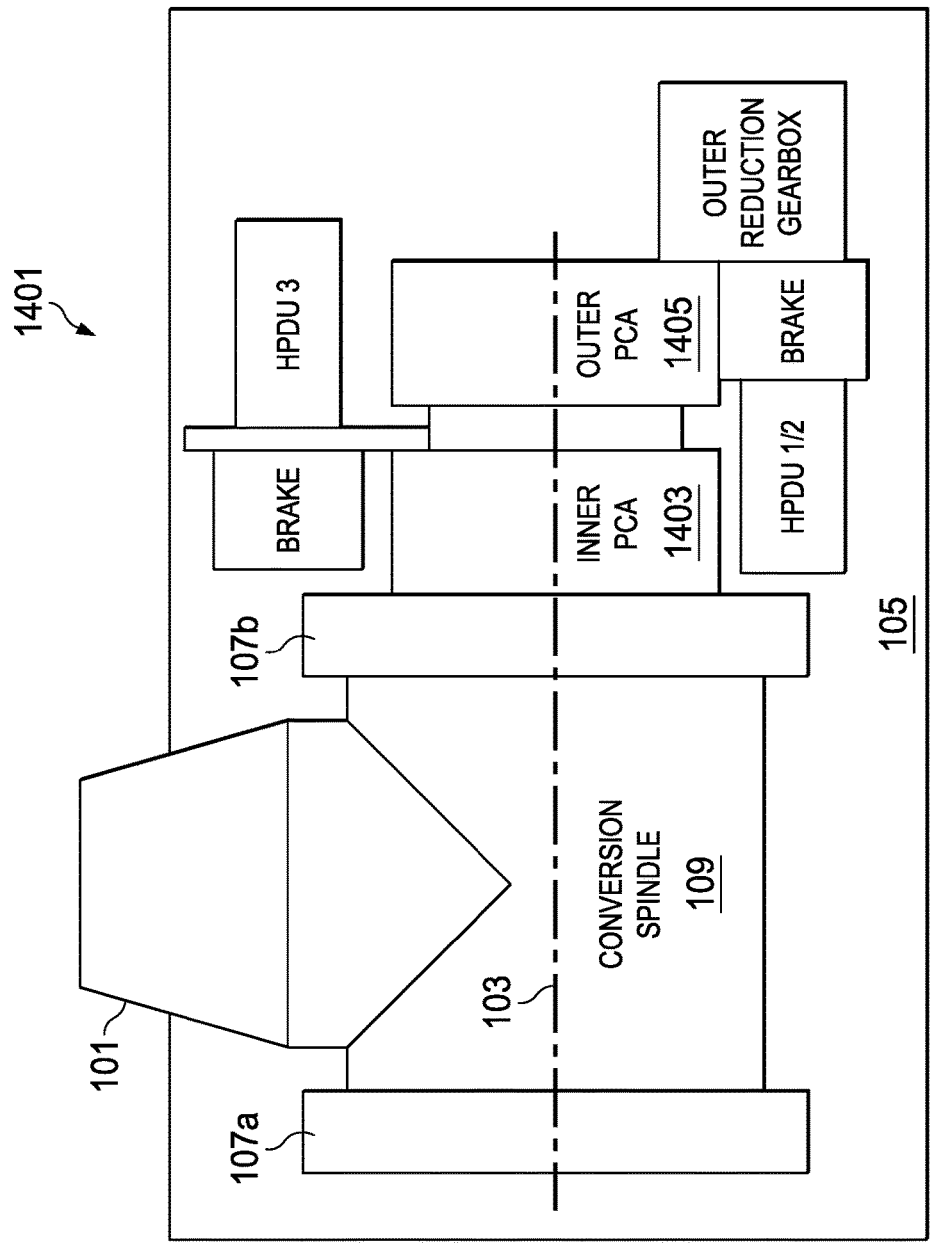
FIG. 16 is a schematic view looking down of an actuator system, according to one arrangement of the embodiment from FIG. 14.
Figure 17:
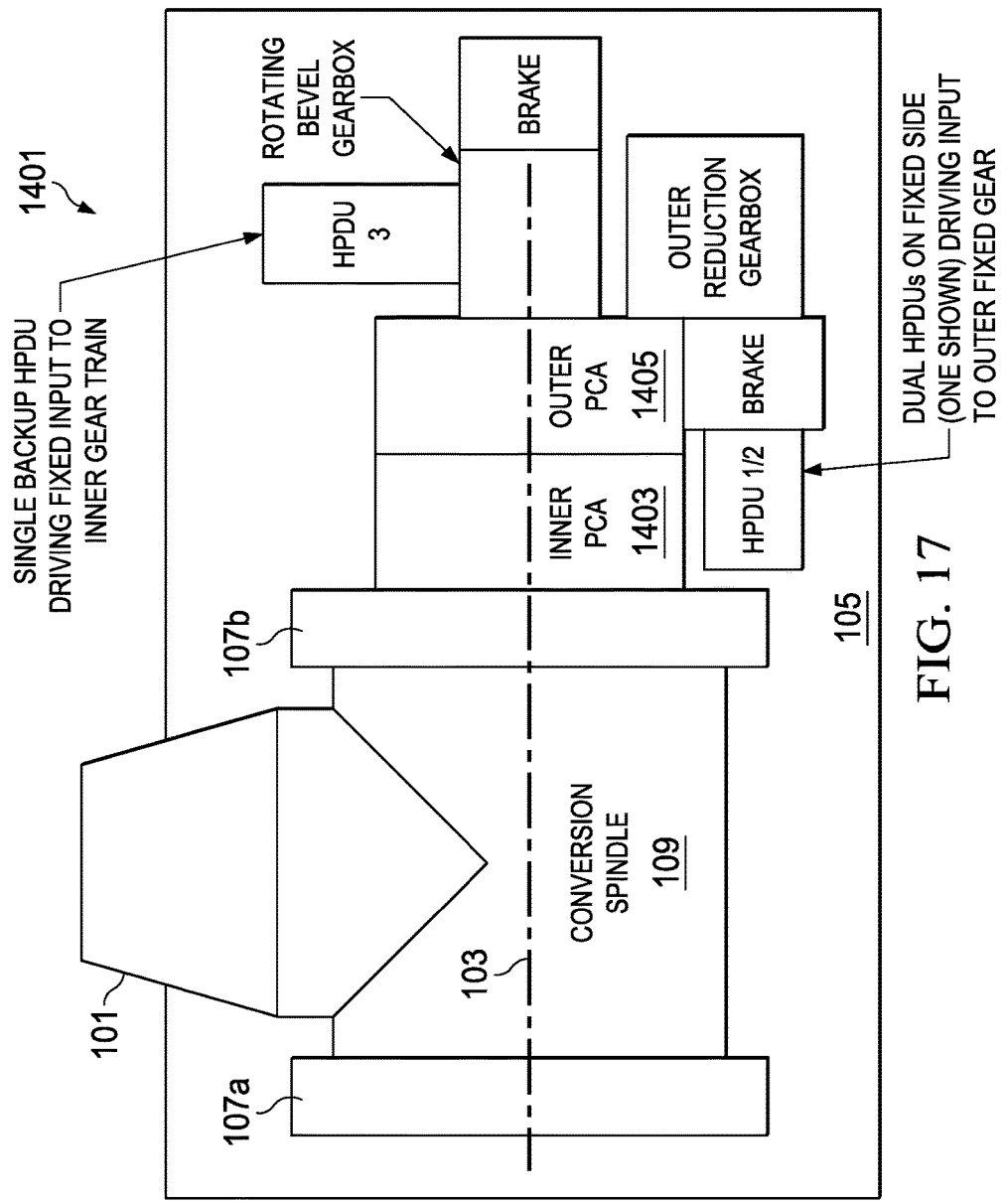
FIG. 17 is a schematic view looking down of an actuator system, according to one arrangement of the embodiment from FIG. 14.
Figure 18:
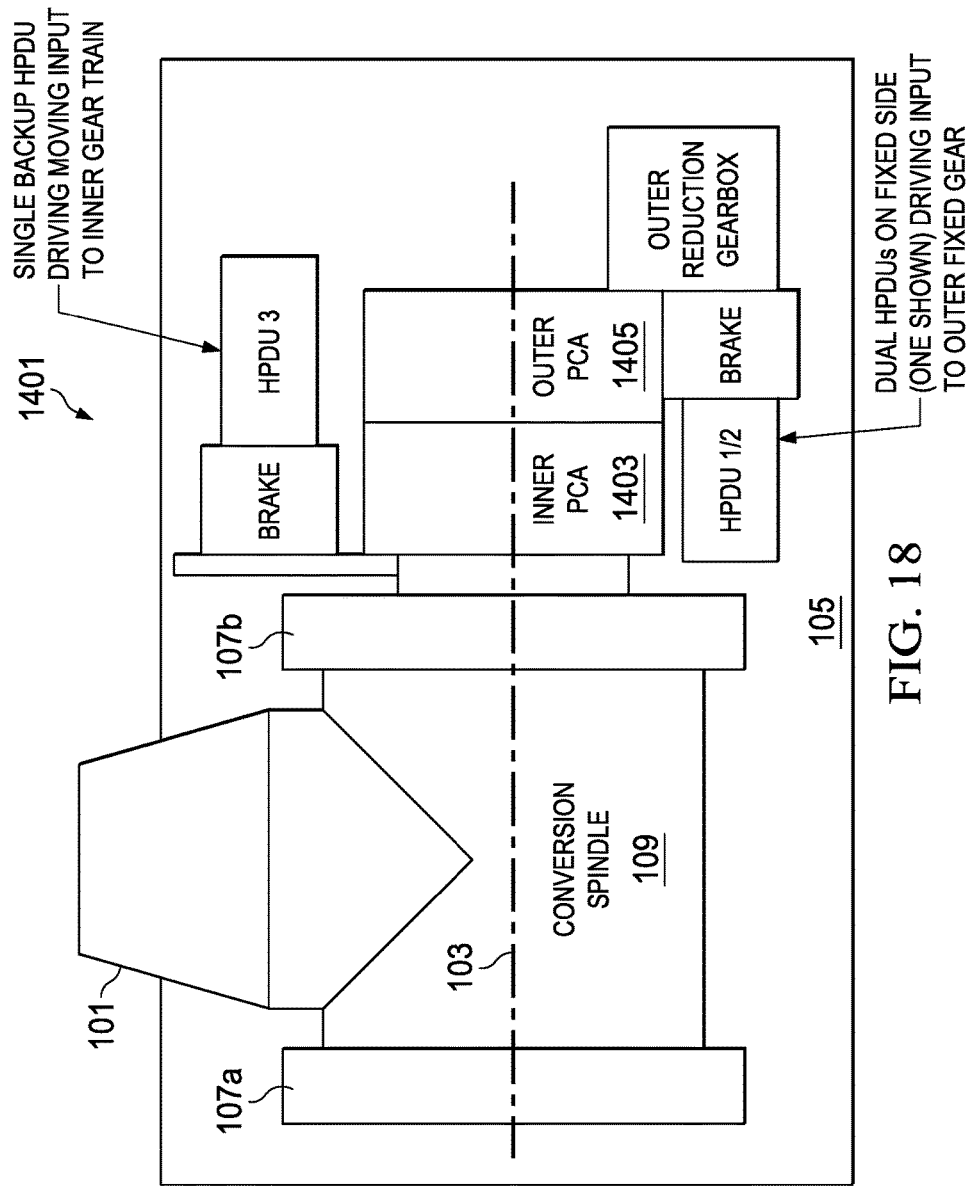
FIG. 18 is a schematic view looking down of an actuator system, according to one arrangement of the embodiment from FIG. 14.

Referring to FIG. 16, one embodiment of actuator system 1401 is functionally illustrated. Outer differential planetary system 1405 has a housing that is grounded and fixed to the airframe 105. Outer differential planetary system 1405 has a differential sun gear that is coupled to the housing of the inner differential planetary system 1403. The inner differential planetary system 1403 has a differential sun gear that is coupled, directly or indirectly, to the conversion spindle 109. FIG. 17 illustrates another functional arrangement of actuator system 1401. FIG. 18 illustrates another functional arrangement of actuator system 1401.

Actuator system 201 includes two planetary elements nested within one another. In another embodiment, actuator system 1401 can include multiple planetary elements adjacent to one another. In all embodiments having redundant differential planetary elements, each planetary element is capable of moving the pylon throughout its full range of motion.

Unique advantages of the embodiments in the present disclosure include: 1) the compact design; 2) load path efficiency since the rotary motion is imparted directly to the pylon; 3) full motion to the pylon is provided by either differential planetary system in the event of a failure of the other outer differential planetary system; and 4) the complex mechanical elements are enclosed, thereby reducing the risk of a foreign object jamming the system.

The particular embodiments disclosed herein are illustrative only, as the apparatus and method may be modified and practiced in different but equivalent manners apparent to those skilled in the art having the benefit of the teachings herein. Modifications, additions, or omissions may be made to the apparatus and method described herein without departing from the scope of the invention. The components of the apparatus may be integrated or separated. Moreover, the operations of the apparatus may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. A tiltrotor aircraft, comprising:
a pylon rotatable about a conversion axis;
a first differential planetary assembly comprising:
  a first housing;
  a first ring gear;
  a first differential planetary gear having a first output portion; and
  a first differential sun gear;
a second differential planetary assembly comprising:
  a second housing;
  a second ring gear;
  a second differential planetary gear having a second output portion; and
  a second differential sun gear;
a shaft;
wherein the first output portion is coupled to the second housing such that the second housing rotates at a first output speed;
wherein the second output portion is coupled to the shaft, the shaft being coupled to the pylon such that rotation of the shaft rotates the pylon.

2. The tiltrotor aircraft according to claim 1, further comprising:
a wing.

3. The tiltrotor aircraft according to claim 1, further comprising:
a wing;
a rotatable pylon spindle;
wherein the pylon is mounted to the rotatable pylon spindle.

4. The tiltrotor aircraft according to claim 1, further comprising:
a first pillow block; and
a second pillow block;
wherein the rotatable pylon spindle is mounted to the first pillow block and the second pillow block.

5. The tiltrotor aircraft according to claim 1, further comprising:
a first power drive unit configured to power the first differential planetary assembly by being in geared power communication with the first ring gear.

6. The tiltrotor aircraft according to claim 5, further comprising:
wherein the first ring gear is in gear mesh with the first differential planetary gear.

7. The tiltrotor aircraft according to claim 5, wherein the first power drive unit is fixed relative to an airframe of the tiltrotor aircraft.

8. The tiltrotor aircraft according to claim 1, further comprising:
a second power drive unit configured to power the second differential planetary assembly by being in geared power communication with the second ring gear.

9. The tiltrotor aircraft according to claim 8, further comprising:
wherein the second ring gear is in gear mesh with the second differential planetary gear.

10. The tiltrotor aircraft according to claim 8, wherein the second power drive unit is fixed relative to the second housing such that the second power drive unit rotates when the second housing rotates.

11. The tiltrotor aircraft according to claim 1, wherein the first differential planetary assembly has a first axis of rotation that corresponds with the conversion axis.

12. The tiltrotor aircraft according to claim 1, wherein the second differential planetary assembly has a second axis of rotation that corresponds with the conversion axis.

13. The tiltrotor aircraft according to claim 1, wherein the first differential planetary assembly is located adjacent to an outer diameter of the second housing of the second differential planetary assembly.

14. The tiltrotor aircraft according to claim 1, wherein the first differential planetary assembly is located adjacently inboard of the second differential planetary assembly.

15. The tiltrotor aircraft according to claim 1, wherein the first differential planetary assembly and the second differential planetary assembly are mechanically coupled in series such that a speed with which the pylon is rotated is a total of a first speed of the first differential planetary assembly and a second speed of the second differential planetary assembly.

16. The tiltrotor aircraft according to claim 1, wherein the first differential planetary assembly and the second differential planetary assembly are mechanically coupled in series such that either of the first differential planetary assembly and the second differential planetary assembly can rotate the pylon should if one of the first differential planetary assembly and the second differential planetary assembly malfunction.

* * * * *